United States Patent [19]

Douglas

[11] Patent Number: 5,663,882
[45] Date of Patent: Sep. 2, 1997

[54] METHOD AND APPARATUS FOR FABRICATING ROOFING CRICKETS

[75] Inventor: Bruce F. Douglas, Kennebunk, Me.

[73] Assignee: NRG Barriers, Inc., Portland, Me.

[21] Appl. No.: 552,410

[22] Filed: Nov. 3, 1995

[51] Int. Cl.⁶ .................................................. G05B 19/4097
[52] U.S. Cl. ............... 364/468.03; 83/76.9; 364/468.24; 364/474.09; 364/474.24
[58] Field of Search ............... 364/474.09, 474.13, 364/474.24, 474.02, 468.01, 468.03, 468.24; 52/745.19, 13, DIG. 10; 83/72, 74, 76.1, 76.6, 76.7, 76.8, 76.9

[56] References Cited

U.S. PATENT DOCUMENTS

| | | | |
|---|---|---|---|
| 3,242,573 | 3/1966 | Noel | 33/1 |
| 3,541,243 | 11/1970 | Whitsel | 178/6.6 |
| 3,610,299 | 10/1971 | Vureit et al. | 364/474.34 X |
| 3,805,650 | 4/1974 | Pearl | 83/522 |
| 4,430,718 | 2/1984 | Hendren | 364/191 |
| 4,444,078 | 4/1984 | Pearl | 83/374 |
| 4,503,644 | 3/1985 | Couto | 52/13 |
| 4,551,810 | 11/1985 | Levine | 364/474.09 X |
| 4,683,791 | 8/1987 | Demont | 83/171 |
| 4,887,219 | 12/1989 | Strauser | 364/474.09 |
| 4,965,740 | 10/1990 | Schofield et al. | 364/508 X |
| 5,251,142 | 10/1993 | Cramer | 364/474.09 |
| 5,315,906 | 5/1994 | Ferenczi et al. | 83/76.9 |
| 5,327,625 | 7/1994 | Clark, Jr. et al. | 83/76.8 |
| 5,430,662 | 7/1995 | Ahonen | 364/408.03 X |

Primary Examiner—Joseph Ruggiero
Attorney, Agent, or Firm—Christopher W. Brody

[57] ABSTRACT

A method and apparatus for fabricating roofing crickets includes the steps of generating the dimensions of roofing cricket components, which when assembled, form the roofing cricket. Knowing the dimensions of each cricket component, a cutting assembly which utilizes a rotatable cutting saw and is controllable in an X-Y plane is controlled to cut each cricket component from a tapered insulation board. The cricket components can then be assembled into the roofing cricket.

14 Claims, 4 Drawing Sheets

STEP 1: SNAP CHALK LINES BETWEEN THE FOLLOWING POINTS-

A. "B" & "D" (CRICKET WIDTH)
B. "A" & "B" (CRICKET VALLEY)
C. "B" & "C" (CRICKET VALLEY)
D. "C" & "D" (CRICKET VALLEY)
E. "D" & "A" (CRICKET VALLEY)

NOTE: THE MIDPOINT OF A STANDARD DIAMOND CRICKET WILL ALWAYS BE HALFWAY BETWEEN POINTS "A" & "C".

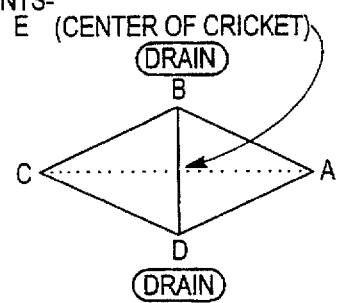

STEP 2: LAY PANELS IN THE FOLLOWING ORDER-

1ST - PANEL 1 AS SHOWN IN ILLUSTRATION 1.
2ND - PANEL 2 AS SHOWN IN ILLUSTRATION 1.
3RD - PANEL 3 AS SHOWN IN ILLUSTRATION 1.
4TH - PANEL 4 AS SHOWN IN ILLUSTRATION 1.
5TH - PANEL 5 AS SHOWN IN ILLUSTRATION 2.
6TH - PANEL 6 AS SHOWN IN ILLUSTRATION 2.

CUT AWAY AND DISCARD THE SHADED AREA AS SHOWN.

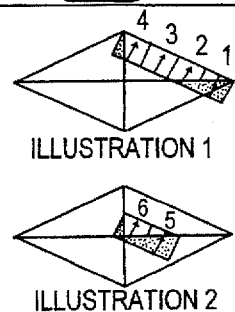

STEP 3: REPEAT STEP 1 & STEP 2 FOR THE THREE REMAINING QUADRANTS.

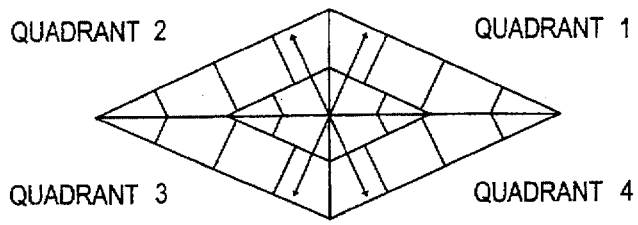

QUADRANT 2   QUADRANT 1
QUADRANT 3   QUADRANT 4

*FIG. 3* PRIOR ART

METHOD AND APPARATUS FOR FABRICATING ROOFING CRICKETS

FIELD OF THE INVENTION

The present invention is directed to a method and apparatus for fabricating roofing crickets and, in particular, an automated fabrication process which precuts cricket components off-site so that they can be easily assembled into a roofing cricket on site.

BACKGROUND ART

It is well known in the art to use structures or "crickets" on flat roofing surfaces to divert or direct water in a particular direction or to a particular location or area, e.g., a drain. The cricket shape depends on the particular flat roof configuration it is being installed on and whether there are any other upstanding structures of the like on the roof which must interface with the cricket.

A flat or tapered roof with no structures could employ a cricket 100 such as that depicted in FIG. 1. In this cricket, water is shed in four different directions as shown by the arrows. If a flat roof includes an upstanding structure having a wall surface, a cricket 200 as shown in FIG. 2 might be used, the surface 201 abutting the upstanding structure wall. The arrows shown in FIG. 2 illustrate the diverting of water in two directions.

Although any materials could be used to form these types of roofing crickets, often times a foam building material is used such as "TAPERED E'NRG'Y 2" which is manufactured by NRG Barriers, Inc. of Portland, Me. This roofing material typically comes as a tapered insulation board composed of closed cell polyisocyanurate foam core bonded on each side during the foaming process to fiber reinforced facers. Typically, the insulation board comes in panel shapes in four foot square sections varying in thickness between ½" minimum and 4" maximum. The insulating boards also are tapered in slopes ranging from 1/16" up to ½" per foot.

Presently, the crickets as illustrated in FIGS. 1 and 2 are cut at the job site where the crickets are being installed. Typically, chalk lines are used on an insulating panel and a utility knife is used to cut the various cricket components which are then pieced together to form the final cricket. FIG. 3 shows an exemplary three step process detailing the prior art technique of forming crickets. This prior art technique is extremely labor intensive and generates a considerable amount of waste material which presents a disposal problem. In addition, due to the high labor content and need for highly skilled personnel, the process is extremely expensive and generates very high workman's compensation rates.

In view of the disadvantages noted above for making crickets, a need has developed to find a way to more efficiently and cost effectively fabricate roofing crickets.

Responsive to this need, the present invention provides a method and apparatus which permits fabrication of a roofing cricket which overcomes the disadvantages noted above. More specifically, according to the invention, a method and apparatus is provided which permits the manufacture of cricket components by first generating the desired cricket component shape by its specific dimensions and controllably cutting a material to be used as the cricket in a sequential fashion. The thus formed cricket components can then be labeled and shipped to the job site for cricket assembly and installation.

SUMMARY OF THE INVENTION

Accordingly, it is a first object of the present invention to provide a method and apparatus which efficiently fabricates roofing cricket components.

Another object of the present invention is to reduce the high labor and waste disposal costs associated with prior art cricket fabrication techniques.

It is a further object of the present invention to provide a process for fabricating cricket components which allows for off-site manufacture.

A still further object of the present invention is to provide a controlled cutting machine capable of cutting cricket components from a roofing cricket material based on target cricket component shapes.

Other objects and advantages of the present invention will be apparent as a description thereof proceeds.

In satisfaction of the foregoing objects and advantages, the present invention discloses a method of making a roofing cricket comprising the steps of first generating a plurality of cricket component shapes, each cricket component shape specifying the dimensions thereof and corresponding to a respective cricket component. The plurality of cricket component shapes, when assembled, form the roofing cricket.

Once the desired cricket component shapes are generated, preferably via computer aided drafting, a material is selected along with a cutting machine. The cutting machine is controllable to cut at least on a diagonal in an X-Y cutting plane. The cutting machine is then controlled to cut the cricket material along a path to produce a first cricket component, the path based on the generated cricket component shape. The cutting action also produces a cricket material remainder. The controlled cutting continues using the remainder of the cricket material or additional cricket material, the cutting based on the remaining cricket component shapes generated to produce each of the cricket components.

Preferably, the cricket material is an insulating material, more preferably, an insulating foam material which is tapered.

Preferably, the cutting machine utilizes a saw blade which can align with a diagonal cut to be made in the cricket material.

To facilitate assembly of the cricket, each of the cricket components can be labeled after cutting.

In the apparatus aspect of the invention, means for generating and storing the plurality of cricket component shapes is provided. Also provided is a cutting machine which is controllable to cut on at least a diagonal in an X-Y cutting plane. The cutting machine is combined with a computer/controller which stores the information related to the cricket component shapes and controls the cutting machine to sequentially cut the cricket material into the plurality of cricket components. The apparatus can also include means for labeling each of the cricket components to facilitate the cricket assembly.

BRIEF DESCRIPTION OF THE DRAWINGS

Reference is now made to the drawings accompanying the invention wherein:

FIG. 3 is an illustration detailing a prior art cricket formation technique;

DESCRIPTION OF THE PREFERRED EMBODIMENTS

Figure 4:
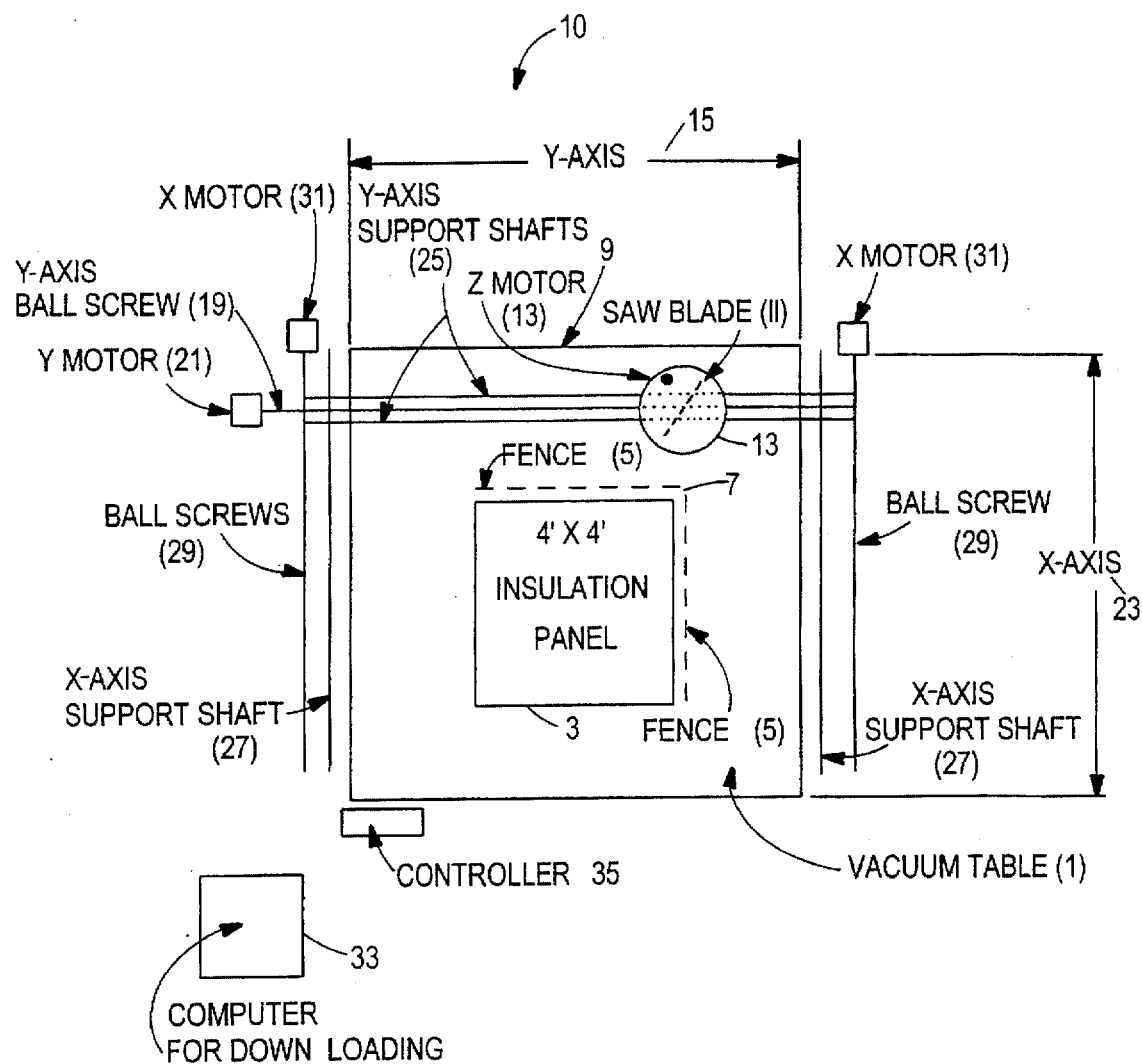
FIG. 4 is a schematic representation of an exemplary apparatus for practicing the invention.

With reference now to FIG. 4, an exemplary apparatus for practicing the inventive method is generally designated by the reference numeral 10. The apparatus includes a vacuum table 1 which holds the workpiece 3 in place for cutting. Since the vacuum tables are well known the art for holding workpieces in place, a further description thereof is not deemed necessary for understanding of the invention. Of course, other known means could be utilized to hold the workpiece 3 in place during the cutting operation to be described below.

The workpiece 3 can be any material suitable for roofing cricket formation as is known in the art. Preferred materials are insulating roofing materials such as foams, more particularly, polyisocyanurate foam panels, either faced or unfaced. Exemplary of these types of insulation panels are TAPERED E'NRG'Y 2, made by NRG Barrier, Inc. of Maine. For illustration purposes, a four foot by four foot TAPERED E'NRG'Y 2 panel is shown as the workpiece in FIG. 4.

The vacuum table 1 also includes fences 5 which position or zero the workpiece 3 for cutting purposes. In the embodiment depicted in FIG. 4, the fences form a 90° angle which then establishes the zero position i.e., (0, 0,) in an X, Y axis coordinate system. Of course, other means to zero the workpiece 3 may also be utilized in the inventive apparatus.

The apparatus 10 also includes a cutting assembly designated by the reference numeral 9. The cutting assembly 9 provides the ability to cut the workpiece 3 into one or more of the cricket components for cricket fabrication as described below.

The cutting assembly 9 employs movement with three degrees of freedom: translation in an X-Y plane and rotation about the Z axis in an X-Y-Z Cartesian coordinate system. By controlling movement with these three degrees of freedom the cutting assembly can be programmed to cut the workpiece along a given path to form each cricket component.

As part of the Z axis motion, the cutting assembly 9 includes a saw blade 11 shown schematically supported by the saw blade support 13. The saw blade 11 is rotatable about the saw blade support center or the vertical Z axis by virtue of the Z motor 17. In operation, the Z motor 17 rotates the saw blade support 13 to align the saw blade, i.e., the plane of the saw cut in a prescribed cutting direction.

Movement of the saw blade support 13 and saw blade 11 along the Y axis 15 will now be described. The saw blade 11 is mounted to a Y axis ball screw 19 for movement therealong. A Y motor 21 is operatively connected to the ball screw 19 to rotate it, this rotation causing the saw blade support 13 to traverse the Y axis.

Movement along the X axis 23 is accomplished as follows. Y axis support shafts 25 are fixed to the saw blade support 13 and further attached to the X axis ball screws 29. The X axis support shafts 27 support the X axis ball screws 29. The ball screws 29 are operatively connected to the X motors 31. X motor operation turns the ball screws 29 which in turns moves the support shafts 25 and saw blade support 13 in the X direction.

As described in greater detail in the method aspect of the invention, simultaneous operation of the X and Y motors permits the saw blade 11 to follow a diagonal path through the workpiece 3 to form a desired cut. Of course, with the saw blade 11 aligned parallel to the X axis 23, a straight cut can also be made through the workpiece 3 if desired.

Also forming part of the apparatus 10 are a computer 33 and controller 35. The computer 33 stores the information including the precise dimensions of each cricket component to be cut from the workpiece 3. This information is fed to the controller 35 which regulates movement of each of the motors 17, 21 and 31 for cutting purposes. As initially described above, the controller 35 orients the saw blade 11 at a given angle (Z axis rotation) with respect to the Y axis. The saw blade 11 is also moved along the X and Y axes so that it enters the workpiece 3 at the specified angle for cutting purposes. The X motors and Y motor drive the saw blade 11 through the workpiece 3 to achieve a desired cut. The cutting action can then be repeated along the necessary paths to form each of the cricket components for subsequent roofing cricket assembly.

It should be understood that the apparatus depicted in FIG. 4 is merely exemplary of an apparatus used to practice the inventive method. That is, any saw cutting apparatus which is capable of predetermining a particular cricket component shape to be cut and moving a cutting saw blade through a workpiece in an X,Y plane to achieve the desired shape can be utilized with the inventive method. For example, different components other than ball screws, may be utilized to achieve the movement along either the X or Y axis.

Likewise, the computer 33 and controller 35 can be any known types capable of storing information representing each cricket component shape and controlling the movement of the saw blade 11 for cutting purposes.

Figure 5:
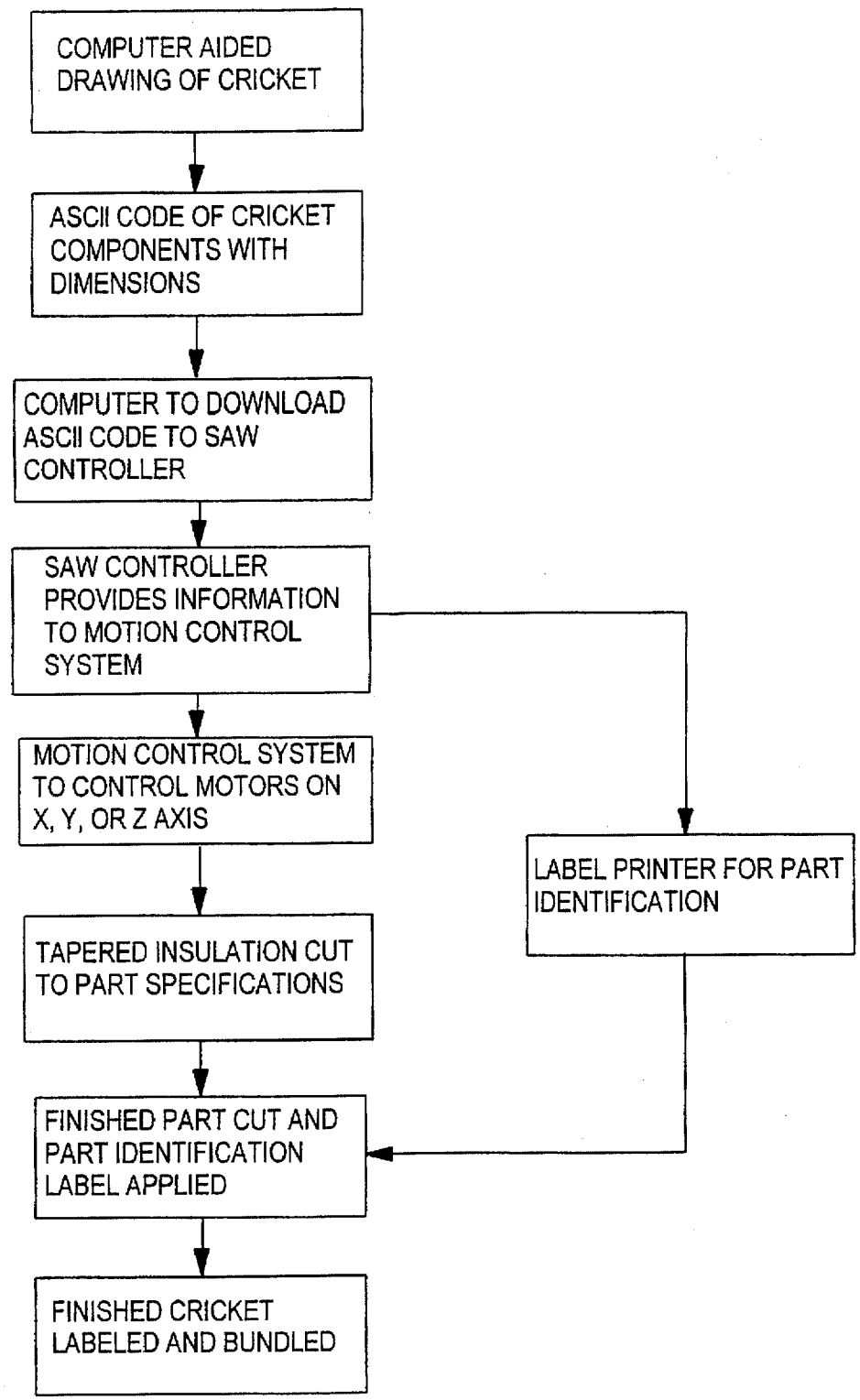
FIG. 5 is a flow sheet depicting a preferred mode of practicing the invention.

In the method aspect of the invention, an exemplary flow diagram is depicted in FIG. 5 which uses tapered insulation boards such as TAPERED E'NRG'Y 2. Of course, the inventive method could be used with any material known for use in crickets.

Figure 1:
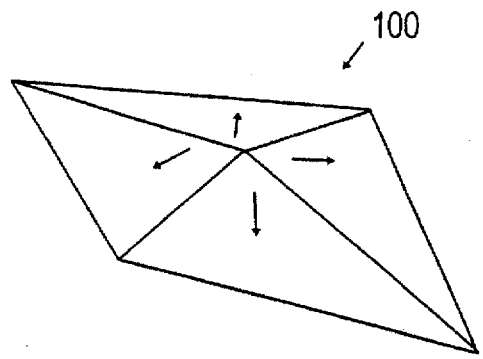
FIGS. 1 and 2 show perspective views of two different types of roofing crickets.
Figure 2:
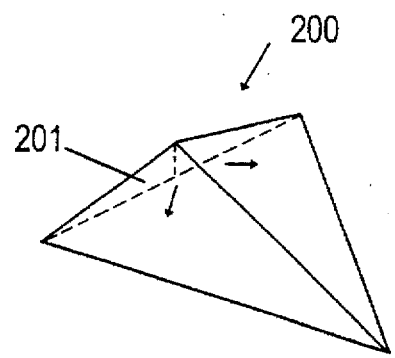
Figure 6:
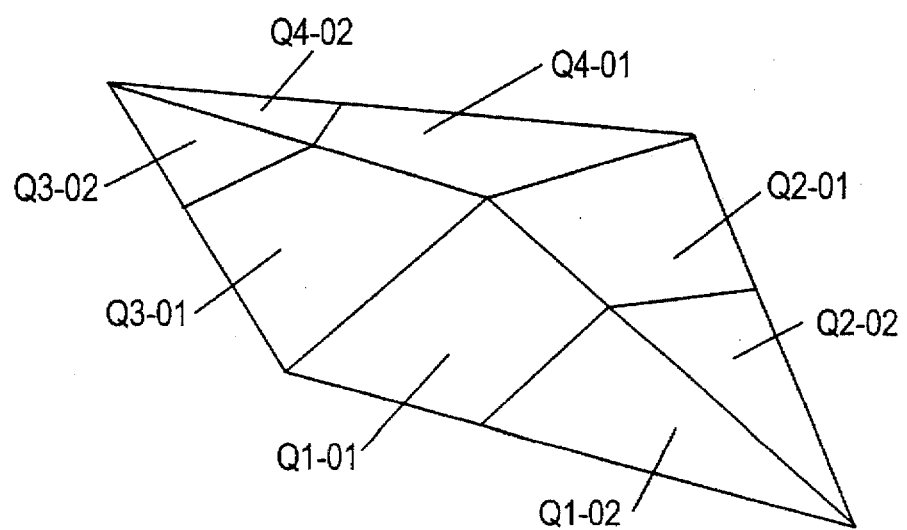
FIG. 6 shows an exemplary full pyramidal cricket divided into four quadrants.

The first step in the inventive method is generation of a drawing of a desired cricket. This is typically done using a computer aided drawing program as is known in the art. For example, a cricket width and dimension would be selected, e.g. 42' long and 16' wide, the cricket being of full pyramidal shape such as that shown in FIG. 1. This information is inputted into the computer aided drawing (CAD) program. The program would then calculate the shape by dimension of each cricket component. When using a tapered insulation panel, the program would also account for the particular slope of the insulation panel FIG. 6 shows an exemplary full pyramidal cricket divided into four quadrants, each quadrant made of two cricket components. As will be described below, the individual cricket components numbered (Q1-Q4—01, 02) are subsequently assembled into a roofing cricket.

Once the desired overall cricket shape and component drawing is made, the drawings are converted into computer code for each cricket component with the specific dimensions for each component. It should be understood that the generation of the cricket and cricket components shapes takes into account the taper of the material to be cut up into the cricket shape as well as the target slope of the cricket. For example, a cricket having a ¼" per foot slope would be cut from a tapered insulation material having the same slope.

Once the cricket components are identified by specific dimensions, the dimensions are then fed to a computer for downloading the code to the saw controller.

The following table' TABLE 1, illustrates an exemplary text representing the instructions to the saw for cutting purposes. Each line of the table represents four of the eight quadrants depicted in FIG. 6. The code would typically represent a fully pyramidal cricket having a ¼" slope, 42' long and 16' wide. The start and finish X,Y coordinates identify the start and stop position of the cutting saw using a 4 foot by 4 foot matrix which corresponds to the 4 foot by 4 foot tapered panel shown in FIG. 4.

TABLE 1

| | Start (X, Y) | Finish (X, Y) |
|---|---|---|
| 42-16-F(¼" slope) - Q1-01 | (48.000, 24.000) | (0.000, 0.000) |
| 42-16-F(¼" slope) - Q1-02 | (48.000, 36.000) | (0.000, 21.125) |
| 42-16-F(¼" slope) - Q2-01 | (30.000, 48.000) | (0.000, 36.125) |
| 42-16-F(¼" slope) - Q2-02 | (29.667, 0.000) | (11.250, 48.000) |

When using a tapered insulation panel, the panel is arranged on the vacuum table in a predetermined manner so that the saw controller can cut the panel in the desired manner to accommodate for the panel's slope. This orientation can be taken into account when producing the ASCII code of cricket components with dimensions for input through the saw controller and motion control of the various motors.

Once the saw controller has provided the complete information for cutting each quadrant of the cricket, the information is fed to a motion control system which controls the motors on the X, Y and/or Z axis as shown in FIG. 5.

With reference back to FIG. 4, the cutting saw blade 11 is rotated to enter the workpiece at a given X,Y coordinate and stop cutting at the finish X,Y coordinate as shown in the table above. Once the cutting saw finishes the cut for Q1-01, it returns to a zero position, a new insulation panel or workpiece is provided on the table or a remainder is razeroed and the cutting saw proceeds to cut the second cricket component of the next quadrant, i.e., Q1-02. This sequence of cutting is continued until all eight components as shown in FIG. 6 are cut.

Concurrently with the cutting operation, a label printer prints a part identification for each cricket component. The finished cricket component is identified by label application with the cricket components then bundled for assembly in known fashion at a given site.

Using the inventive process and apparatus, roofing crickets can be cut in a fraction of the time normally taken when done so at a job site. Waste disposal costs are reduced since the cutting is done off-site where waste disposal is more easily achieved.

Furthermore, when comparing the prior art technique of making a full pyramidal cricket as shown in FIG. 3 which requires making cuts in six panels, the inventive apparatus and method is clearly superior in all respects.

As such, an invention has been disclosed in terms of preferred embodiments thereof which fulfill each and every one of the objects of the present invention as set forth hereinabove and provides a new improved method and apparatus for fabricating roofing crickets.

Of course, various changes, modifications and alterations from the teaching of the present invention may be contemplated by those skilled in the art without departing from the intended spirit and scope thereof. Accordingly, it is intended that the present invention be limited only by the terms of the appended claims.

What is claimed is:

1. A method of making a cricket, comprising the steps of:
   a) generating respective data on a plurality of cricket component shapes, each cricket component shape having specified dimensions and corresponding to a respective cricket component, said plurality of cricket component shapes forming a shape corresponding to said cricket;
   b) providing a cricket sheet material having a tapered form of predetermined slope;
   c) providing a cutting machine comprising a saw blade, said cutting machine being controllable to cut along a selected path in an X-Y cutting plane of one side of said cricket sheet material;
   d) controlling an angular position of said saw blade about a Z axis perpendicular to the X-Y plane to cut said cricket sheet material along the selected path to produce a first cricket component based on a generated cricket component shape; and
   e) continuing said controlled cutting of one of said cricket sheet material or another cricket sheet material according to step d) to produce said plurality of cricket components.

2. The method of claim 1 wherein:
said cricket sheet material comprises a foam material.

3. The method of claim 2 wherein:
said cricket sheet material is square in shape.

4. The method of claim 1 wherein:
said saw blade is aligned with said selected path from initiation of said cutting step.

5. The method of claim 1, comprising the further step of:
labeling each cricket component for subsequent assembly of said cricket.

6. The method of claim 1, comprising the further step of:
assembling said plurality of cricket components into said cricket.

7. The method of claim 5, comprising the further step of:
assembling said plurality of cricket components into said cricket.

8. The method of claim 1, wherein:
said cricket is pyramidal in shape.

9. The method of claim 1, wherein:
each said cricket component has at least one tapered surface.

10. The method of claim 2 wherein:
said foam material comprises a polyisocyanurate foam.

11. An apparatus for making a cricket, comprising:
   a) means for generating and storing respective data on a plurality of cricket component shapes, each cricket component shape having specified dimensions and corresponding to a respective cricket component, said plurality of cricket component shapes forming a shape corresponding to said cricket;
   b) a cutting machine comprising a saw blade, controllable to cut a piece of cricket sheet material having a tapered form of predetermined slope, along a selected path in an X-Y cutting plane corresponding to one side of said cricket sheet material;
   c) a controller for receiving the generated data and for controlling movement of said saw cutting machine, including an angular position of said saw blade about a Z axis perpendicular to the X-Y plane, to form said plurality of cricket components by sequentially cutting the cricket sheet material into said plurality of cricket components.

12. The apparatus of claim 11, further comprising:
means for labeling each cricket component to facilitate cricket assembly.

13. The apparatus of claim 11, further comprising:
means for retaining said cricket sheet material in place during cutting.

14. The method of claim 1, wherein:
said another cricket sheet material is used for step e).

* * * * *